United States Patent [19]
Boriani et al.

[11] Patent Number: 5,447,013
[45] Date of Patent: Sep. 5, 1995

[54] METHOD AND DEVICE FOR PRODUCING CARTONS OF CIGARETTES

[75] Inventors: Silvano Boriani, Bologna; Marco Brizzi, Zola Predosa; Antonio Gamberini, Bologna, all of Italy

[73] Assignee: G.D Societa' Per Azioni, Bologna, Italy

[21] Appl. No.: 128,833

[22] Filed: Sep. 29, 1993

[30] Foreign Application Priority Data

Oct. 2, 1992 [IT] Italy ................. BO92A0339

[51] Int. Cl.⁶ .................. B65B 35/30; B65B 35/38
[52] U.S. Cl. .......................... 53/446; 53/544; 53/531
[58] Field of Search ................ 53/143, 436, 446, 523, 53/544; 414/761, 762, 765, 788.3, 791.3

[56] References Cited

U.S. PATENT DOCUMENTS

| | | | |
|---|---|---|---|
| 4,770,566 | 9/1988 | Okada et al. | 414/765 |
| 5,141,388 | 8/1992 | Georgitsis et al. | 414/761 |
| 5,271,208 | 12/1993 | Christine et al. | 53/436 |

FOREIGN PATENT DOCUMENTS

| | | | |
|---|---|---|---|
| 0233657 | 8/1987 | European Pat. Off. | 414/765 |
| 0916510 | 1/1963 | United Kingdom | 414/761 |

*Primary Examiner*—John Sipos
*Assistant Examiner*—Rodney A. Butler
*Attorney, Agent, or Firm*—Marshall, O'Toole, Gerstein, Murray & Borun

[57] ABSTRACT

A method and device for producing cartons of cigarettes from respective groups of equioriented packets forming a first and second row arranged one on top of and contacting the other, whereby the two rows of packets in each group are parted to enable the first row to be rotated substantially 180° in relation to the second prior to restoring the first row to the superimposed mutually contacting position.

14 Claims, 3 Drawing Sheets

METHOD AND DEVICE FOR PRODUCING CARTONS OF CIGARETTES

BACKGROUND OF THE INVENTION

The present invention relates to a method of producing cartons of cigarettes.

In particular, the present invention relates to a method of producing cartons of cigarettes from respective groups of equioriented packets arranged in two superimposed rows.

More specifically, the present invention relates to a method of producing cartons of cigarettes, each consisting of two half cartons having respective separate superimposed wrappings normally joined along a respective longitudinal edge, for enabling the carton to be opened book-fashion and subsequent separation of the two half cartons.

On cartons of the aforementioned type, the wrappings of the two half cartons normally present specular structures in relation to the longitudinal connecting edge when the carton is closed.

That is to say, if the closed carton is placed with one of its larger lateral surfaces contacting a horizontal supporting surface, the wrappings of the two half cartons are inverted in relation to each other, with the bottom surface of the top wrapping, for example, facing upwards. To position both wrappings with the bottom surface facing downwards, the top half carton must be turned 180° about the longitudinal edge joining it to the bottom half carton.

In the event the two half cartons are formed from groups of equioriented packets as mentioned above, such rotation provides for equiorienting the wrappings of the two half cartons, but also for oppositely-orienting the respective packets, which is aesthetically undesirable.

SUMMARY OF THE INVENTION

It is an object of the present invention to provide a method of producing cartons of cigarettes splittable into two half cartons, and wherein the respective packets are equioriented alongside separation and equiorientation of the half cartons.

According to the present invention, there is provided a method of producing cartons of cigarettes from respective groups of packets, each group being defined by a number of equioriented packets forming a first and second row arranged one on top of and contacting the other; characterized by the fact that, for each said group, it comprises stages consisting in parting the two rows of packets; rotating the first row substantially 180° in relation to the second row; and restoring the two rows to said position one on top of and contacting the other.

According to a preferred embodiment of the above method, the second row is maintained substantially fixed in said parted position when the first row is rotated; and the two rows are preferably parted by moving one of the rows in a first direction perpendicular to its longitudinal axis.

Moreover, according to the above method, the first row is preferably rotated about its longitudinal axis; and, during rotation, the packets in the first row are preferably compressed in a second direction parallel to said longitudinal axis.

The present invention also relates to a device for producing cartons of cigarettes.

According to the present invention, there is provided a device for producing cartons of cigarettes from respective groups of packets, each group being defined by a number of equioriented packets forming a first and second row arranged one on top of the other and having respective parallel longitudinal axes; characterized by the fact that it comprises a turnover unit for turning the first row of packets substantially 180° in relation to the second row; the turnover unit in turn comprising parting means for parting the two rows; gripping means for positively engaging and retaining the packets in said first row; and first activating means connected to at least part of said gripping means, for rotating said part of said gripping means by substantially 180°.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
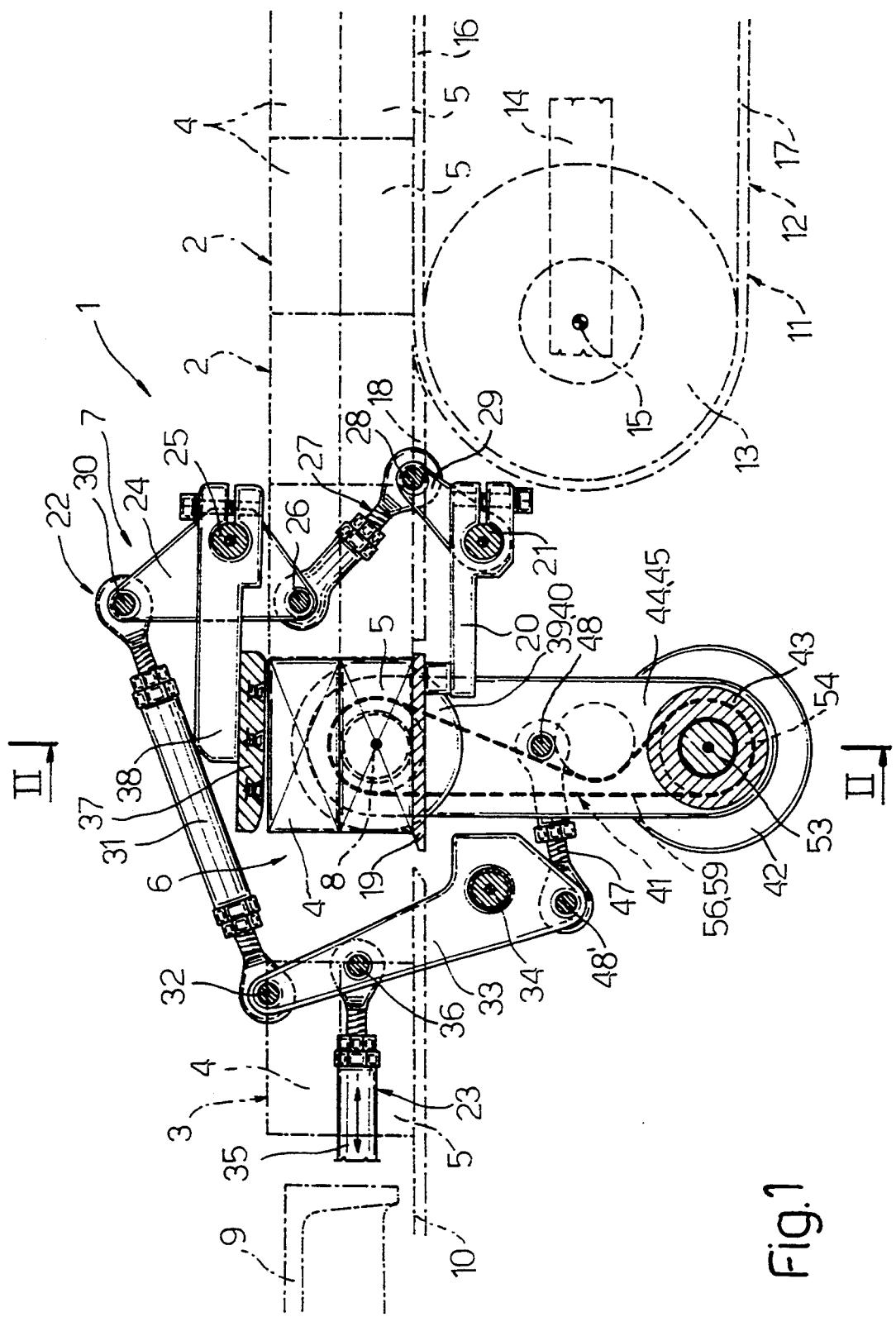
FIG. 1 shows a partially sectioned side view of a preferred embodiment of the device according to the present invention in a first operating position.

Number 1 in the accompanying drawings indicates a device for producing cartons 2 of cigarettes from respective groups 3 of packets arranged side by side in two superimposed rows 4 and 5 in turn defining respective half cartons.

Device 1 comprises a turnover station 6; and a turnover unit 7 housed in station 6, and which provides for turning bottom row 5 substantially 180° about its longitudinal axis 8 and in relation to row 4.

Groups 3 are fed successively to station 6 by a push device 9, by which they are pushed transversely in relation to axis 8 along a supporting plate 10, and are picked up at the output of station 6 by a conveyor belt 11 comprising a belt 12 looped about two pulleys 13, one of which is powered and only one of which is shown in the accompanying drawings. Pulleys 13 are connected in rotary manner to a supporting frame 14, rotate about respective axes 15 (only one shown) perpendicular to the FIG. 1 plane, and divide belt 12 into a delivery branch 16 and a return branch 17.

Branch 16 extends coplanar with a connecting plate 18 extending inside station 6 and in turn coplanar with plate 10 and adjacent to a supporting plate 19 interposed between plates 10 and 18, and which provides for supporting group 3 with respective row 5 contacting plate 19.

Plate 19 forms part of turnover unit 7, and is connected integral with one end of a supporting arm 20, the other end of which is fitted to a shaft 21 parallel to axes 15 and mounted for rotation on a fixed support (not shown).

Figure 3:
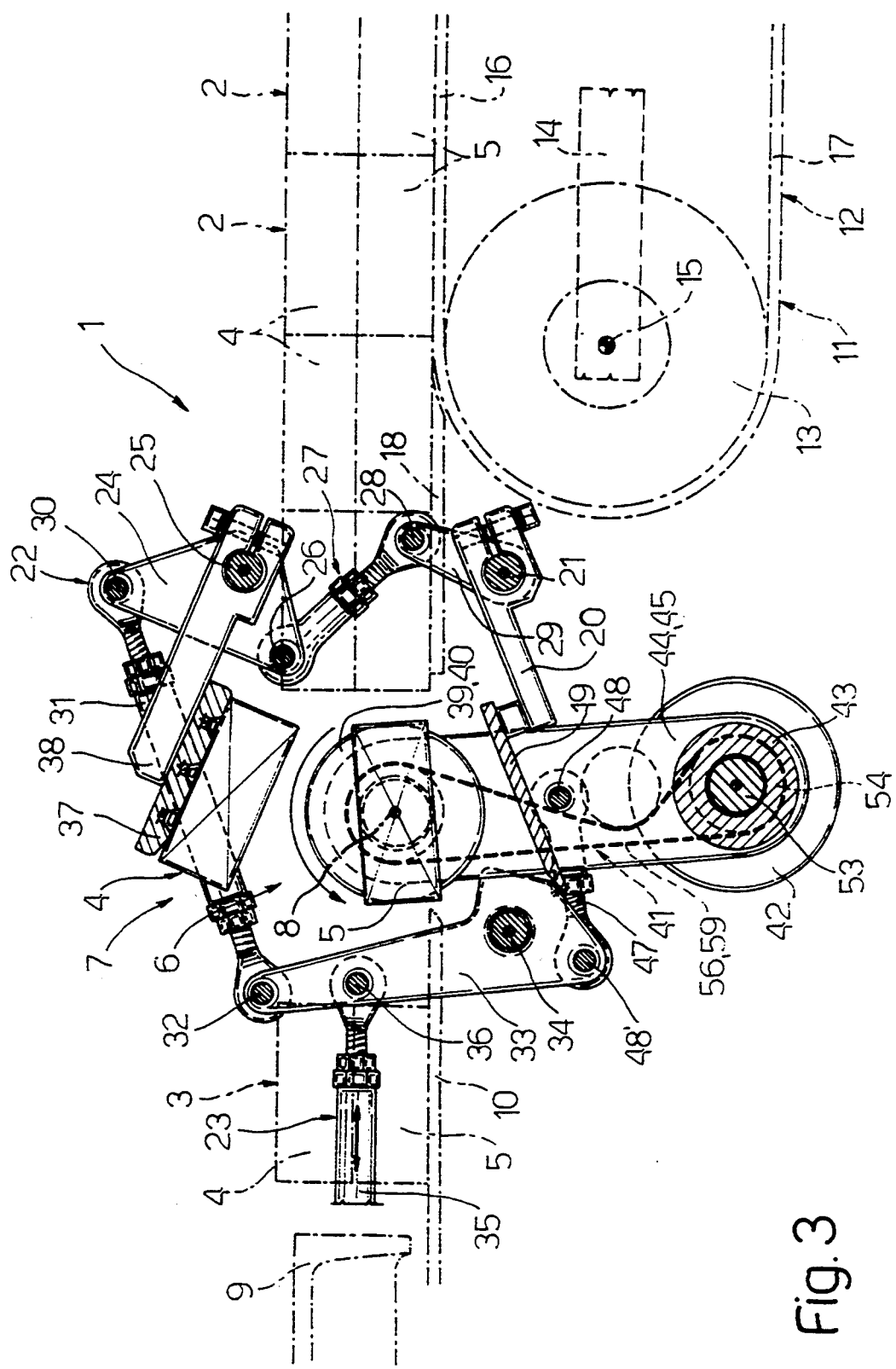
FIG. 3 shows the same view of the FIG. 1 device in a second operating position.

As shown in FIGS. 1 and 3, arm 20 is rotated about the axis of shaft 21 by an articulated drive 22 activated by a linear actuator 23 for moving arm 20 and plate 19 between a raised idle position, wherein plate 19 is coplanar with plates 10 and 18, and a lowered operating position wherein plate 19 is moved substantially clear of station 6 and beneath the plane of plates 10 and 18 by a distance greater than half the longer transverse dimension of row 5.

Drive 22 forms part of unit 7, and comprises a rocker arm 24 extending substantially vertically over plate 18 and fitted centrally to a shaft 25 parallel to shaft 21 and connected in rotary and axially fixed manner to a fixed support (not shown).

A first bottom end of rocker arm 24 is fitted with a pin 26 parallel to shafts 21 and 25 and on which pivots one end of a connecting rod 27 of adjustable length. By means of a pin 28 parallel to pin 26, the other end of connecting rod 27 is hinged to one end of a crank 29 fitted to shaft 21.

Again with reference to FIGS. 1 and 3, a first top end of rocker arm 24 is fitted with a pin 30 parallel to shafts 21 and 25 and on which pivots one end of a connecting rod 31 of adjustable length. By means of a pin 32 parallel to pin 26, the other end of connecting rod 31 is hinged to the top end of a rocker arm 33 pivoting on a central pin 34 fixed to a support (not shown). Rocker arm 33 is connected to actuator 23, the output rod 35 of which is connected to rocker arm 33 by a pin 36 fitted to rocker arm 33 between pins 32 and 34.

Unit 7 also comprises a suction pickup head 37 supported substantially facing and over plate 19 by an arm 38, the opposite end of which not integral with head 37 is fitted to shaft 25. Head 37 provides for positively engaging and moving row 4 in relation to row 5 and in a direction substantially perpendicular to axis 8.

Figure 2:
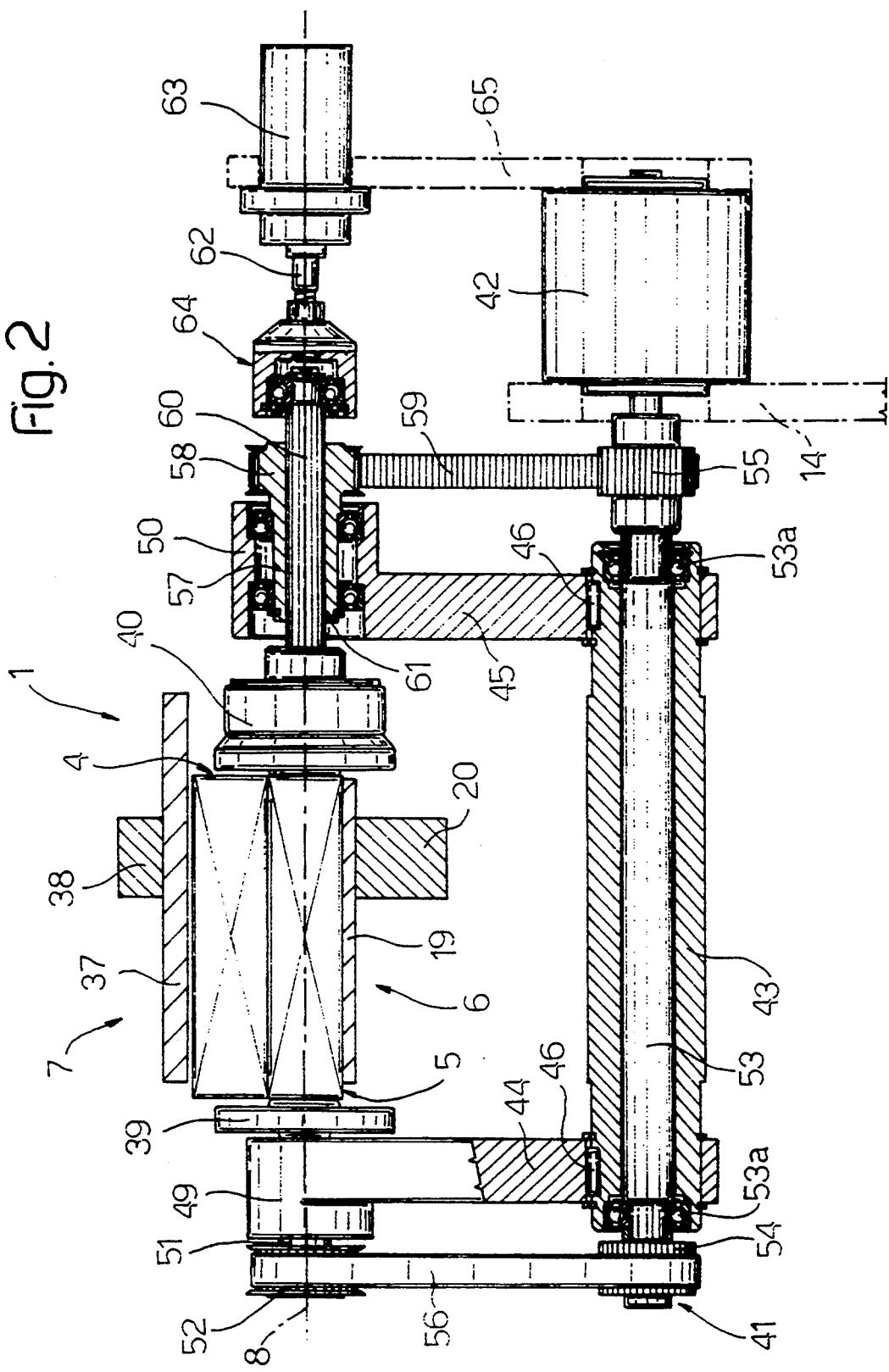
FIG. 2 shows a section along line II—II in FIG. 1, with parts removed for clarity.

As shown, particularly in FIG. 2, unit 7 also comprises two heads 39 and 40 aligned along axis 8 and on either side of row 5.

Heads 39 and 40 are rotated about axis 8 by a belt device 41 comprising a drive motor 42 integral with a portion of frame 14. In particular, heads 39 and 40 are fitted to a cylindrical tubular body 43 supported beneath plate 19 by frame 14 in rotary and axially and transversely fixed manner, as explained later on; and to two cranks 44 and 45 extending perpendicularly upwards from body 43 and each presenting an end portion fitted to a respective end portion of body 43 by a key 46. As shown in FIGS. 1 and 3, one of cranks 44, 45 is connected to drive 22 so as to oscillate with the other crank 44, 45 and body 43 about the axis of body 43. Crank 44, 45 is connected to drive 22 by a connecting rod 47 (FIGS. 1 and 3) hinged at one end to crank 44, 45 by a pin 48, and at the other end to the bottom end of rocker arm 33 by pin 48′.

At the opposite end to that connected to body 43, cranks 44 and 45 terminate in respective sleeves 49 and 50, the first of which is engaged in rotary and axially fixed manner by a through shaft 51 fitted integral with head 39 at one end and with a gear 52 at the other.

Gear 52 forms part of device 41, which also comprises output shaft 53 of motor 42. Shaft 53 is supported in axially fixed manner on frame 14 by motor 42, and extends through and supports in rotary manner tubular body 43 via the interposition of two bearings 53a. The end portions of shaft 53 projecting outwards of body 43 are fitted with two gears 54 and 55, the first of which is connected angularly to gear 52 by a toothed belt 56.

Sleeve 50 partially houses a bush 57 connected in rotary and axially fixed manner to sleeve 50 and fitted integrally, on the end outside sleeve 50, with a gear 58 connected angularly to gear 55 by a toothed belt 59.

Head 40 is operated by a drive shaft 60 extending through and connected to bush 57 by a splined coupling 61, and the end portion of which, opposite that connected to head 40, is connected to the output rod 62 of a linear actuator 63 via a joint 64, which connects rod 62 and shaft 60 integral with each other, while at the same time permitting shaft 60 to rotate about its axis 8 and in relation to rod 62. Actuator 63 is supported in axially fixed manner in relation to frame 14 by a bracket 65 fitted in oscillating manner to the body of motor 42 so as to move shaft 60 and head 40 to and from head 39 along axis 8 and slightly compress the packets in row 5 before they are rotated about axis 8.

Operation of device 1 will now be described commencing with plate 19 in the raised position, pickup head 37 in the lowered position, and a group 3 of packets positioned on plate 19 inside station 6 by pusher 9.

As of the above condition, head 37 engages the packets in row 4 by suction, and, at the same time, actuator 63 is operated so as to move head 40 towards head 39 and slightly compress the packets in row 5. At this point, actuator 23 is operated so as to move output rod 35 towards station 6, rotate rocker arm 33 clockwise (in FIGS. 1 and 3) about pin 34, and so rotate rocker arm 24 and shaft 25 clockwise (in FIGS. 1 and 3) about the axis of shaft 25.

Via arm 38, rotation of shaft 25 gradually raises head 37 and row 4, which is detached from row 5 in a direction substantially perpendicular to axis 8; and plate 19 is lowered into the operating position by arm 20 being rotated about the axis of shaft 21 by crank 29 in turn operated by rocker arm 24 via connecting rod 27.

At the same time plate 19 is lowered into the operating position, cranks 44 and 45, together with body 43, are rotated anticlockwise by connecting rod 47 about the axis of shaft 53. Consequently, as shafts 21 and 25 are located on the station 6 side facing conveyor 11, and head 37 and plate 19 rotate in opposite directions away from each other, anticlockwise rotation of cranks 44 and 45 moves row 5 away from conveyor 11, and so increases the distance between rows 5 and 4 on the one hand and row 5 and plate 19 on the other, in a direction crosswise in relation to axis 8 and substantially perpendicular to the direction in which row 4 is displaced by head 37 in relation to row 5.

Once the distance between row 5 and plate 19 is such as to enable row 5 to be rotated about axis 8, actuator 23 is locked for maintaining head 37 and plate 19 substantially stationary in the raised and lowered operating positions respectively, and motor 42 is activated so as to rotate shafts 51 and 60, and consequently row 5, substantially 180° about axis 8 via shaft 53 and belts 56, 59.

Once row 5 is rotated, actuator 23 is again activated so as to withdraw rod 35 from station 6 and so operate drive 22 as to gradually and simultaneously restore plate 19, head 37 and cranks 44, 45 to their original positions and, hence, rows 4 and 5 to the superimposed position forming carton 2, which is pushed on to conveyor 11 by the next group 3 fed into station 6 by pusher 9, and presents two rows 4 and 5 of oppositely-oriented packets enabling the formation of two identical half cartons (not shown).

We claim:

1. A method of producing cartons (2) of cigarettes from respective groups (3) of packets, each group (3) being defined by a number of equioriented packets forming a first (5) and second (4) row arranged one on top of and contacting the other; the method comprising, stages of feeding said groups in succession to a fixed position (6) and, for each said group (3) in said fixed position (6), parting the two rows (4, 5) of packets while maintaining the two rows (4, 5) from advancing beyond the fixed position (6); rotating the first row (5) substantially 180° in relation to the second row (4) without advancing the first row (5) beyond the fixed position; and restoring the two rows (4, 5) to said arrangement one on top of and contacting the other at the fixed position.

2. A method as claimed in claim 1, including maintaining the second row (4) substantially fixed in said parted position and at said fixed position (6) when the first row (5) is rotated.

3. A method as claimed in claim 1, including parting said rows (4, 5) by moving one (4) of said rows (4, 5) in a first direction crosswise in relation to the longitudinal axis (8) of the other row (5) and before rotating said first row (5).

4. A method as claimed in claim 3, including parting said rows (4, 5) by further moving said other row (5) in a second direction crosswise in relation to its longitudinal axis (8) and to said first direction.

5. A method as claimed in claim 3, wherein said first (5) and second (4) rows are respectively the bottom row (5) and top row (4) of a respective said group (3); and that, prior to parting said rows (4, 5) in said first direction, positioning the first row (5) contacting a supporting body (19) in turn positioned supporting said group (3); the supporting body (19) being withdrawn from the first row (5) substantially prior to rotation of the first row (5), and being restored to said supporting position substantially upon said rows (4, 5) being restored to said superimposed mutually contacting arrangement.

6. A method as claimed in claim 1, including rotating said first row (5) about its longitudinal axis (8).

7. A method as claimed in claim 6, wherein, when said first row (5) is rotated, compressing the packets in said first row (5) in a third direction parallel to said longitudinal axis (8).

8. A device for producing cartons (2) of cigarettes from respective groups (3) of packets, each group (3) being defined by a number of equioriented packets forming a first (5) and second (4) row arranged one on top of the other and having respective parallel longitudinal axes; the device comprising means for feeding said groups in succession to a fixed position (6) and a turnover unit (7) arranged at said fixed position (6) for turning the first row (5) of packets substantially 180° in relation to the second row (4) without advancing the first row (5) beyond the fixed position (6); the turnover unit (7) in turn comprising parting means (37, 44, 45) for parting the two rows (4, 5) while maintaining the two rows (4, 5) from advancing beyond the fixed position; gripping means (39, 40, 63) for positively engaging and retaining the packets in said first row (5); and first activating means (41) connected to at least part (39, 40) of said gripping means (39, 40, 63), for rotating said part (39, 40) of said gripping means (39, 40, 63) by substantially 180°, wherein the two rows (4, 5) are restored to said arrangement one on top of and contacting the other at the fixed position.

9. A device as claimed in claim 8, wherein said parting means (37, 44, 45) comprise a pickup head (37) for positively engaging said second row (4); and second activating means (22, 23) for moving the pickup head (37) in a first direction substantially perpendicular to the longitudinal axis (8) of said first row (5).

10. A device as claimed in claim 9, wherein said gripping means (39, 40, 63) comprise clamping means (39, 40, 63) for compressing the packets in the first row (5) in a third direction substantially parallel to the longitudinal axis (8) of said first row (5).

11. A device as claimed in claim 10, wherein said second activating means (22, 23) are associated with said clamping means (39, 40, 63) for moving said clamping means (39, 40, 63) in said second direction together with said first row (5).

12. A device as claimed in claim 10, wherein said clamping means (39, 40, 63) comprise two pressure heads (39, 40) aligned in said third direction; and an actuator (63) for moving at least one (39) of said heads (39, 40) in said third direction.

13. A device as claimed in claim 12, further comprising a supporting body (19) for supporting at least one of said groups (3); and means for adjusting and moving said supporting body (19) between an idle position, wherein the supporting body (19) is positioned substantially between said pressure heads (39, 40) for supporting said group (3), and an operating position wherein the supporting body (19) is positioned substantially outwards of a line extending through the pressure heads (39, 40), and in a position spaced, in use, from said at least one of said groups (3).

14. A device as claimed in claim 8, wherein said parting means (37, 44, 45) comprise second activating means (22, 23) for moving said first row (5) in a second direction substantially perpendicular to its longitudinal axis (8) and to said first direction.

* * * * *